Oct. 20, 1959     J. D. WEBSTER     2,909,297
TRUCK AND TILTING CRADLE FOR CONTAINER
Filed July 5, 1955     6 Sheets-Sheet 3
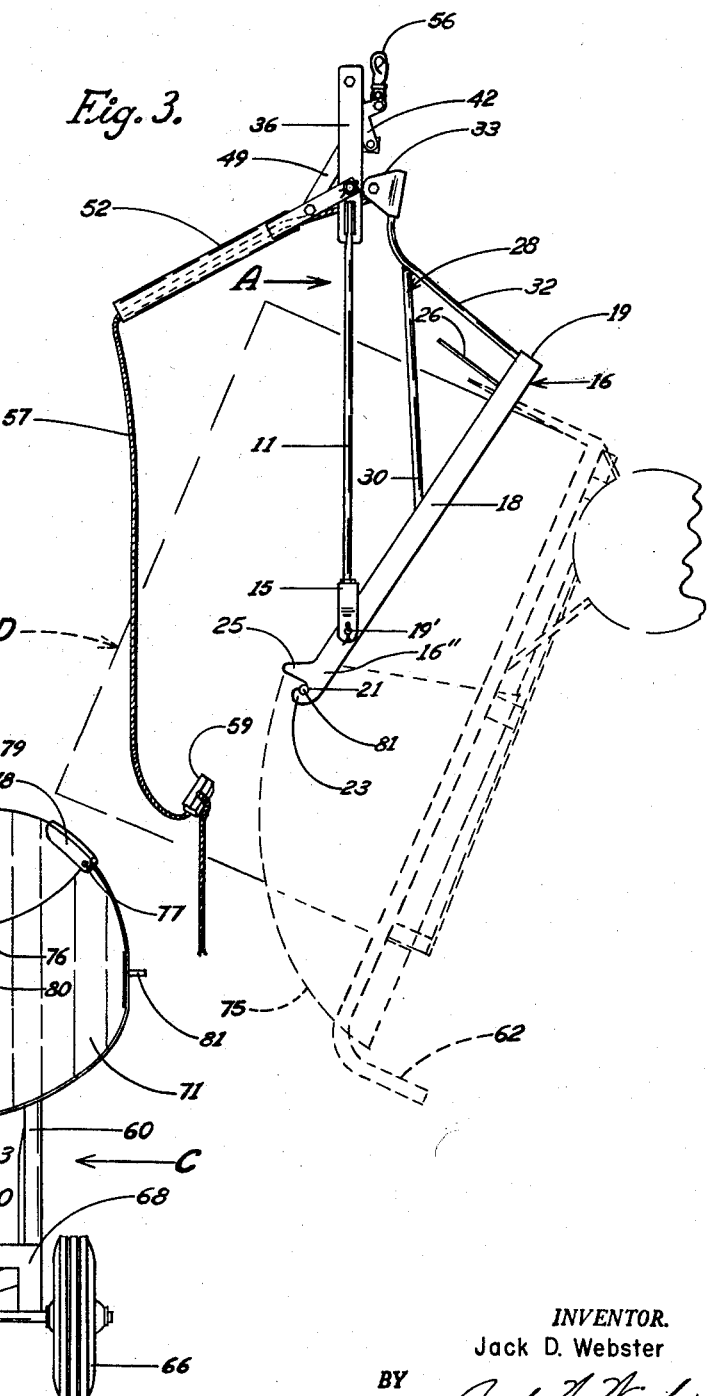
INVENTOR.
Jack D. Webster
BY
ATTORNEY

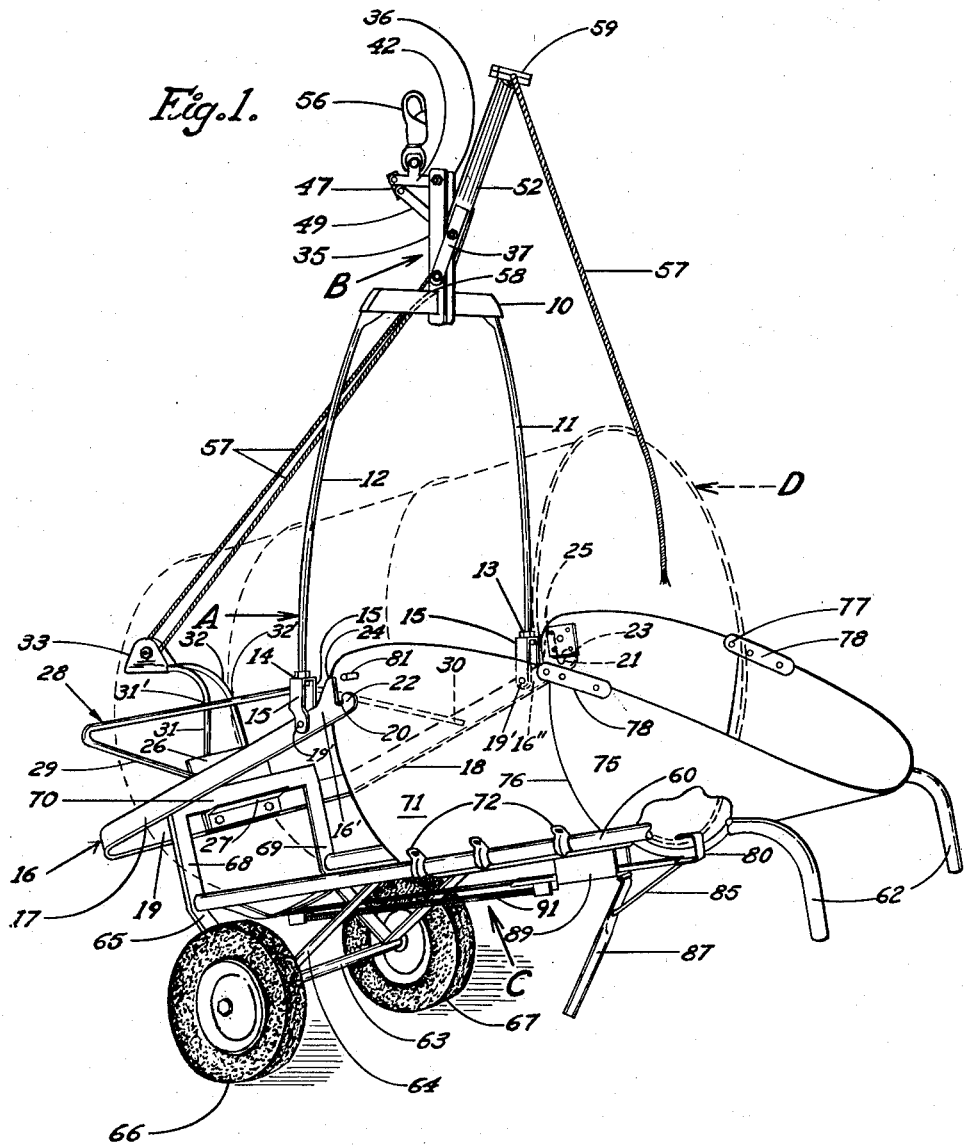
INVENTOR.
Jack D. Webster

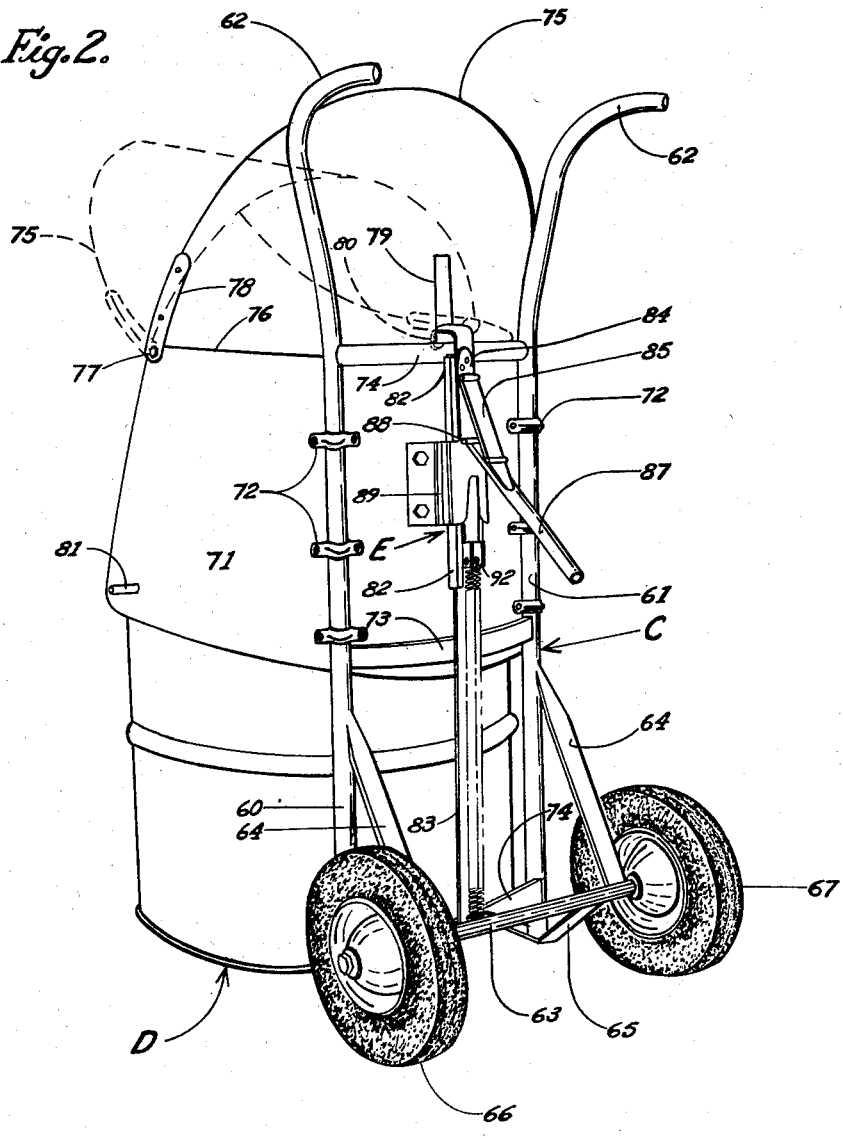

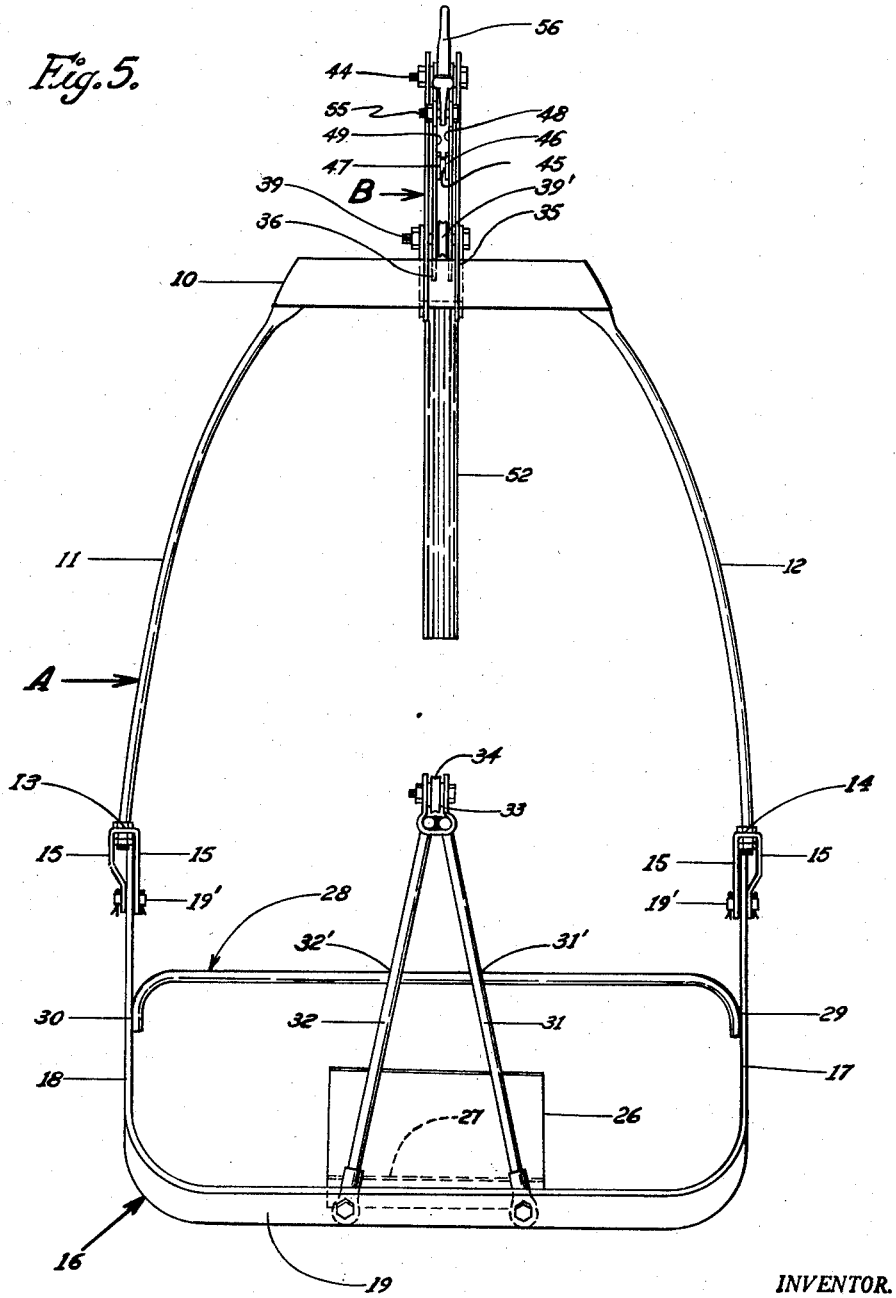

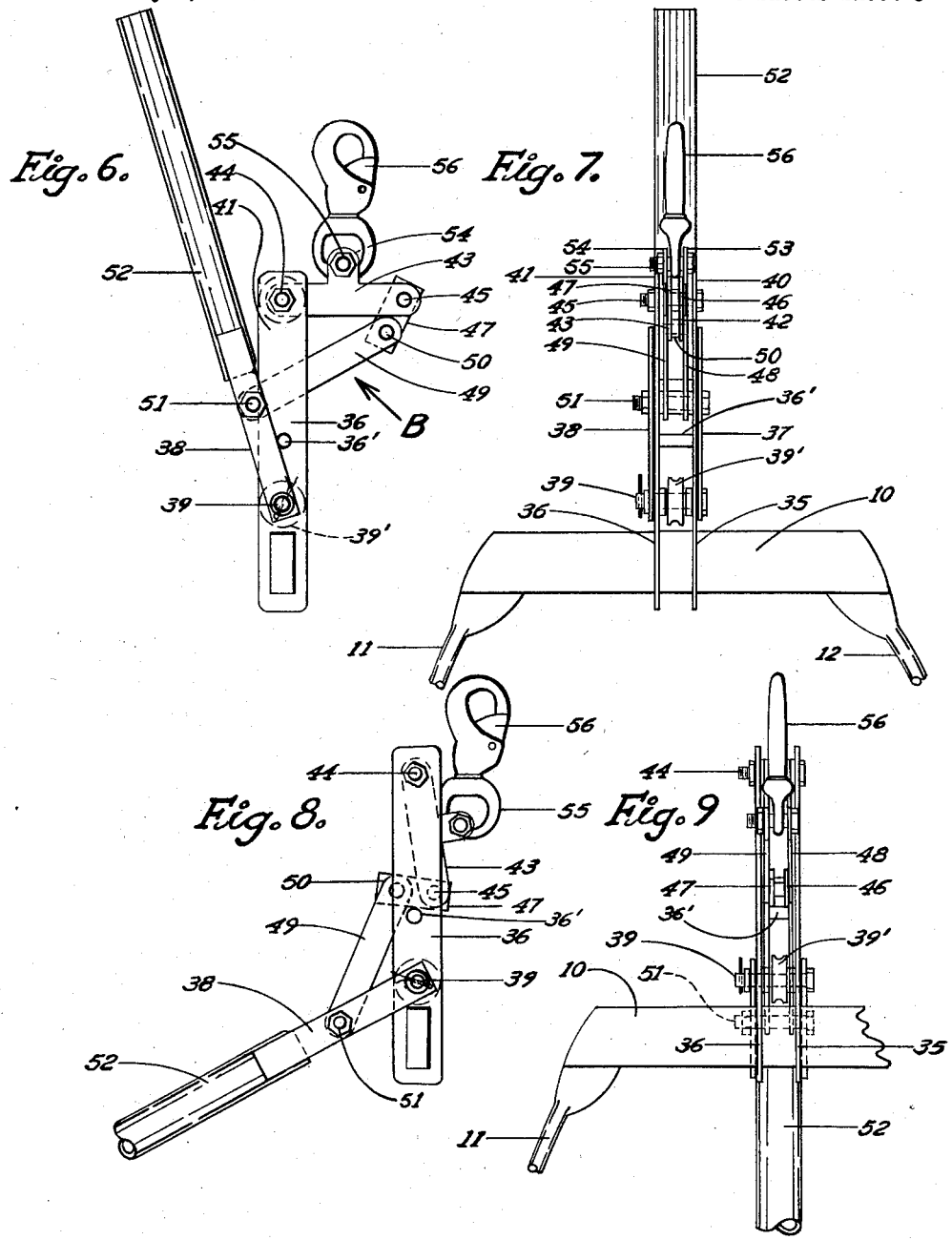

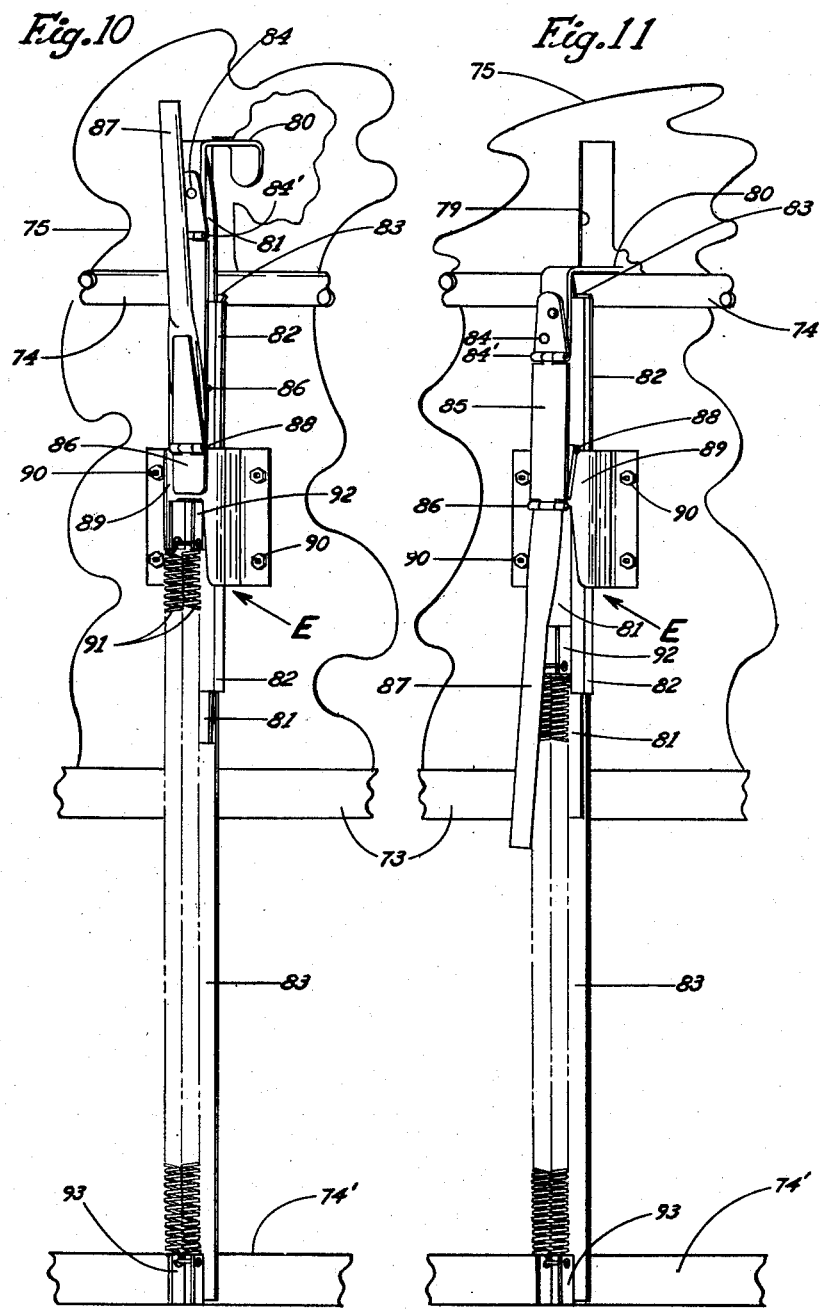

United States Patent Office 2,909,297
Patented Oct. 20, 1959

2,909,297
TRUCK AND TILTING CRADLE FOR CONTAINER

Jack D. Webster, St. Paul, Minn.

Application July 5, 1955, Serial No. 519,709

5 Claims. (Cl. 214—313)

My invention relates to an improvement in a device for collecting and dumping collected material and more particularly to a tiltable cradle in which the truck is mounted, the container having been secured to the truck.

It is an object of my invention to provide a mobile truck with which a container may be easily picked up and secured thereon and a cradle device adapted to receive the truck in a new and efficient manner. It is a further object to provide a cradle member in which the truck is easily and securely positioned and which is adapted to be hoisted and in a hoisted position easily tilted, thereby dumping the material in the container.

It is also an object of my invention to provide a container holder and dumping unit therefor which is adapted to be raised by a hoist on a vehicle and then tilted thereby dumping the material from the container, all done by a sole operator.

It is an additional object of my invention to provide linkage means on the cradle whereby the cradle may be raised thereby engaging the same with the truck.

It is a further object of my invention to provide a truck unit on which the container is easily mounted and locked in position thereon. It is also an object to provide means for placing the container in position on the truck and new and novel means for hoisting the truck and tipping the truck while in hoisted position.

I shall not here attempt to set forth and indicate all of the various objects and advantages incident to my invention but other objects and advantages will be referred to in or else will become apparent from that which follows.

The invention will appear more clearly from the following detailed description when taken in connection with the accompanying drawings showing by way of example a preferred embodiment of the inventive idea wherein like numerals are employed to designate like parts throughout.

In the drawings forming part of this application:

Figure 1 is a perspective view of my tiltable cradle with the truck placed in position for engagement with the cradle, the container being shown in broken lines.

Figure 2 is a perspective view of my truck in an upright position with the container mounted thereon.

Figure 3 is a side elevational view of the cradle in tilted dumping position with the truck and container illustrated in broken lines.

Figure 4 is a front view of the truck.

Figure 5 is a rear view of the cradle member.

Figure 6 is a side elevational view of the linkage portion of the cradle with the handle member in raised position.

Figure 7 is a rear view of the cradle linkage with the handle member in raised position with a portion of the cradle shown.

Figure 8 is a view of the linkage shown in Figure 6 with the handle in lowered position.

Figure 9 is a rear view similar to Figure 7 with the handle in lowered position.

Figure 10 is a perspective view of the latch mechanism on the truck in raised open position with only portions of the truck shown.

Figure 11 is a perspective view of the latch mechanism similar to that shown in Figure 10 with the latch in lowered locking position.

Referring to the drawings in detail, the upper portion of the cradle rig unit A includes the top cross bar member 10 to which is secured the depending arms 11 and 12 thus forming an inverted U-shaped member adapted to partially encompass a container. Secured to the lower ends of the arms 11 and 12 are the inverted U-shaped members 13 and 14 respectively. The members 13 and 14 are formed with the side portions 15. Also included in the cradle unit A is the lower U-shaped support cradle member 16 which includes the side arms 17 and 18 which are joined by the base portion 19 and pivoted at 19' to the side portions 15 of the members 13 and 14. In the outer free ends 16' and 16" of the side arms 17 and 18 respectively I have formed the recesses 20 and 21 respectively together with the hook-like portions 22 and 23. Adjacent the recesses 20 and 21 I have provided the guiding stop shoulders 24 and 25 respectively, the function of which will be hereinafter set forth.

Secured to base portion 19 of the lower U-shaped cradle support member 16 is the stop plate 26 which has secured to the lower edge thereof the catch-shoulder portion 27. I also provide the upper U-shaped cradle brace member 28 which has the free ends 29 and 30 thereof secured to the side arm members 17 and 18 respectively. The pulley support members 31 and 32 are secured at their lower ends to the base portion 19 and extend upwardly and outwardly to the member 33 on which is mounted the pulley 34. The support members 31 and 32 are secured at 31' and 32' to the brace 28 to further secure the same and also the brace member 28.

Secured to the top cross bar member 10 is the linkage unit B which includes the upright support members 35 and 36 forming part of the linkage B particularly shown in Figures 6–9. The side arm members 37 and 38 are pivotally secured to the upright support members 35 and 36 respectively by means of the bolt member 39. Rotatably mounted on the bolt 39 is the pulley 39'. Pivotally secured to the upper ends 40 and 41 of the support members 35 and 36 respectively are the upper inverted T-shaped linkage arms 42 and 43. The forward ends of the T-arms 42 and 43 are pivotally connected to the upper ends 40 and 41 of the upright support members 35 and 36 by means of the bolt 44. The rear ends of the T-arms 42 and 43 are pivotally connected by means of the bolt 45 to the upper ends of the relatively short intermediate arms 46 and 47. Pivotally connected to the lower ends of the intermediate arms 46 and 47 are the connecting arms 48 and 49 by means of the bolt 50. The connecting arms 48 and 49 are in turn pivoted to the side arm members 37 and 38 by means of the bolt 51. I further provide the hollow handle member 52 which is secured to the outer ends of the side arm members 37 and 38, and the purpose of which will be hereinafter set forth.

The inverted T-shaped arms 42 and 43 have formed thereon the outwardly extending short arms 53 and 54 respectively which are connected by the bolt 55. The snap hook 56 is secured to the bolt 55, and the hook 56 is secured to a hoist generally mounted on a vehicle which is not shown in the drawings. Thus the clevis 56 supports the cradle A, and in addition the container receiving truck C which carries the container D hereinafter described.

When the handle 52 is moved from the position shown in Figure 6 to that shown in Figure 8, the connecting arms 48 and 49 are pulled forwardly through and between the upright support members 35 and 36 to the downwardly extending position in Figure 8, and as a result the intermediate arms 46 and 47 are moved to a point between the members 35 and 36 with an obtuse angle formed by the members 48 and 49 in conjunction with the members 46 and 47 resting on the pin 36' as in Figure 8. As a further result the inverted T arms 42 and 43 move to a position substantially between the members 35 and 36. With the linkage B moved from the position shown in Figure 6 to that shown in Figure 8 in the manner above described, the linkage is in an over dead center position, and the handle 52 tends to stay in the downwardly extending position of Figure 8. As a result of the above, the support 10 is thereby lifted a predetermined amount with respect, for example, to the hook 56 to place the engaging means of the truck C hereinafter described in engagement with the recesses 20 and 21 of the arms 17 and 18 of the cradle rig unit A ready for hoisting by means not shown.

So that the lower U-shaped support member 16 of the cradle unit A may be easily tilted in a lowered or hoisted position to thereby dump the contents of the container D positioned in the truck C supported by the cradle rig A, I provide the flexible member 57, one end of which is secured to the cross bar 10 at the point 58. The flexible member 57 which may be a rope extends downwardly and around the pulley 34, then upwardly and over the pulley 39' and thence outwardly through the hollow handle 52 with the same secured to the block 59 for easy grasping and adjustment by the operator for tilting of the cradle A. As the flexible member 57 is pulled with the handle 52 in the down position, the rear of the cradle is easily and efficiently drawn up thereby placing the truck C and container D in dumping position as shown particularly in Figure 3. The linkage B is shown in Figures 8 and 9 in the position taken when the handle 52 is in a lowered position whereby the flexible member may be pulled through the handle 52 and the cradle A placed in dumping position.

I further provide the truck C which is composed of the longitudinal frame members 60 and 61 having the handle portions 62 formed thereon. The axle 63 is supported by the brace members 64 and 65 which are secured to the longitudinal members 60 and 61. The axle 63 has mounted thereon the wheels 66 and 67 so that the truck C is mobile. At the lower ends of the longitudinal members 60 and 61 I provide the outwardly extending container support members 68 and 69 which are joined by the cross support member 70. The members 68, 69 and 70 form a support which is slipped under the container D to aid in placing and retaining the container D on the truck C. With the truck C moved into the position shown in Figure 1 the lower edge of the cross member 70 engages over the catch shoulder member 27 to partially secure and position the truck C on the cradle A.

The truck C is also formed with the arcuate container receiving cradle member 71 which may be a one piece arcuate member or may be made in a rigid outline support formation. The cradle 71 for the container C is secured to the longitudinal members 60 and 61 of the truck C by means of the clamp members 72. The longitudinal members 60 and 61 are further braced by the cross members 73, 74 and 74'. I also provide the lip member 75 which is pivotally mounted on the top edge 76 of the cradle 71 by means of the bolts 77 secured through the reinforcing members 78 and the cradle 71. The lip 75 tends to keep material from falling out of the container D when the truck C and the container are handled, and it aids in dumping material from the container. In addition, the lip member 75 is tilted away from the operator for easy positioning and locking of the container in position on the truck C as hereinafter set forth. The lip 75 is formed with the opening 79 through which the hook member 80 is adapted to extend for engagement over the top edge of the container D.

The arcuate cradle member 71 has formed thereon the outwardly extending trunnion members 81 which are moved to the stop shoulders 24 which direct the trunnions 81 down into the recesses 20 and 21 when the truck C is moved into the cradle unit A for hoisting the container D to dump the same.

So that the container D may be securely locked in position on the truck C, I further provide the hook member 80 hereinbefore mentioned which is part of the latching mechanism E mounted on the cradle 71 and shown in enlarged detail in Figures 10 and 11. The hook member 80 is secured to the upper end of the elongated bar 81 which is slidably mounted in the elongated channel member 82. The channel member 82 is supported by the longitudinal centrally positioned brace member 83 which is connected to the cross supports 74, 73 and 74'. Secured to the upper end of the slidable bar 81 is the half hinge portion 84. Hingedly connected to the half hinge portion 84 at 84' is the bar member 85 which is also hingedly connected at 86 to the latch handle 87. One end of the latch handle 87 is hingedly connected at 88 to the channel shaped member 89 which is secured to the cradle support 71 by means of the bolts 90. I further provide the elongated coil springs 91 the upper ends of which are secured to the lower portion of the elongated bar 81 by means of the bracket 92 and generally tend to urge the bar 81 in a lowered position with the hook 80 in a lowered position as in Figures 1, 2, and 10 whereby the container D is secured in position on the truck C. The lower ends of the springs 91 are secured to the cross brace 74' by means of the bracket 93.

With the latch handle member 87 in the raised position shown in Figure 10, the hook 80 is also in a raised position.

*Operation*

With the hook 80 in raised position, the truck C is wheeled to a container such as D which is normally in an upright position. Then the cross support member 70 is moved under the container D as the container is tipped slightly by the operator. The truck C is then tilted up against the container D to place the container in position against the cradle portion 71 of the truck C. To facilitate placing the hook 80 in raised position over the upper edge of container D and to aid in tilting the container D by means of the extended handles 62, the lip member 75 is hinged away from the operator as shown in Figure 2.

With the container D in position on the support members 68, 69 and 70 and against the cradle 71, the latch handle 87 is then lowered to the position shown in Figures 1, 2 and 11. In lowering the handle 87 the hinge point 86 is brought from a point slightly over dead center, when in raised position, to a point on the other side of dead center and then urged downwardly by the action of the springs 91 whereby the hook 80 is held in a lowered locked position upon the upper edge of the container D. In this position the container D and truck C are wheeled to the cradle A as in Figure 1 with the cradle A held above the ground surface by means of a hoist mounted on a vehicle not shown in the drawings. The hoist of the vehicle connects with the clevis 56.

The truck C is moved so that the trunnions 81 are placed up against the stop shoulders 24 and 25, and in this position, as shown in Figure 1, the lower or under edge of the cross support bar 70 is engaged by the catch shoulder 27 to aid in positioning the truck C on the cradle unit A. Then the handle 52 is moved from the raised position of Figure 1 to a lowered position by the operator which, through the operation of the linkage B, thereby raises the cradle A slightly, and the trunnions 81 are guided by the stop shoulders 24 and 25 into the recesses 20. The linkage B is then in a position over dead center, and as a result the handle 52 tends to remain in the lowered position of Figures 3, 8 and 9, with the cradle unit A and the truck C engaged and slightly raised from the ground surface ready for hoisting.

The entire unit is then raised over a truck by means of the hoist. The operator then pulls downwardly on the flexible member 57 which extends through the hollow handle 52, and as this is done, the end member 19 is raised by means of the action of the flexible member 57 on the pulleys 34 and 39' thereby placing the container D in the dumping position illustrated particularly in Figure 3.

After the container D is emptied, the operator then releases the flexible rope member 57, and the entire unit returns to the position somewhat similar to that of Figure 1. In the latter mentioned position the unit is lowered to the ground by means of the hoist not shown. The handle 52 is then placed in the raised position of Figure 1, and the truck C with the empty container D is easily wheeled from the cradle A as the cradle A is in the semi truck-receiving position previously described where the trunnions 81 are free of the recesses 20 and 21 when the handle 52 is in a raised position where it tends to remain due to my construction presented. The position of the cradle A may be adjusted for receiving the truck C by either lengthening or shortening the flexible member 57 by means of the block 59 which is formed with any suitable means for securely positioning it at any point on the member 57.

I have thus disclosed a new and novel device for holding and dumping a container which can be operated easily by a single operator.

The invention is not to be understood as restricted to the details set forth since these may be modified within the scope of the appended claims without departing from the spirit and scope of the invention.

Having thus described the invention, what I claim as new and desire to secure by Letters Patent is:

1. In a device of the character described, a wheeled truck, means formed on said truck for releasably securing a container thereon, a cradle rig adapted to receive said truck including a U-shaped support member, and said U-shaped support member having means for engaging the lower end of said truck, an inverted U-shaped member to which said U-shaped member is pivotally connected, connecting means on said truck, means formed on said U-shaped member for receiving said connecting means of said truck, linkage means for effecting engagement of said U-shaped support member truck engaging means with said connecting means of said truck, and means for tilting said U-shaped support to dump the contents of a container secured to said truck.

2. In the device of claim 1 in which said truck is formed with cradle means for receiving the container, and a lip member hingedly mounted on said cradle means for maintaining material in the container and also directing material therefrom.

3. In a device for carrying and dumping a container, a hand operated wheeled truck, trunnion members connected to said truck, a cradle rig including a lower U-shaped frame member having recess means adapted to receive said trunnion members and a support member to which said lower U-shaped member is pivotally connected, said truck having means for engaging the under lower end of the container, said U-shaped frame having shoulder means adapted to be engaged by said container engaging means of said truck, means for directing said trunnions into said recess means, means for releasably securing a container to said wheeled truck, means for connecting said cradle rig to a hoist, and means for tilting said U-shaped member.

4. In the device of claim 3 in which said means for releasably securing the container to said wheeled truck includes a hook member slidably mounted on said truck and adapted to engage the edge of the container, a handle member pivotally mounted on said truck, lever means pivotally connected to said handle and said slidable hook member for holding said hook in a raised or lowered position, and means for urging said hook member into a lowered position.

5. A tiltable cradle rig for secure engagement with a container supporting device comprising a cross bar, depending side members connected to the ends of said cross bar, vertical support members mounted on said cross bar, a linkage unit including T-bar means having the inner end thereof pivotally connected to the upper ends of said vertical support members, intermediate arm means having the upper end thereof pivotally connected to the outer end of said T-bar means, connecting arm means having the upper end thereof pivotally connected to the lower end of said intermediate arm means, side arm means having the lower end thereof pivotally connected to said vertical support members and the upper end thereof pivotally connected to the lower end of said connecting arm means, hollow extension means secured to the upper end of said side arm means, hook means connected to said T-bar means for engagement with hoist means, and a U-shaped support member having the free ends thereof pivotally connected to the lower ends of said depending side members, means on the free ends of said U-shaped support member for engagement with engageable portions of a container supporting device, means on said U-shaped support member for additional engagement with a container supporting device, a pulley supported on said U-shaped support member, a second pulley supported on said vertical support members, a flexible member having one end thereof secured adjacent said cross bar and passing over said pulley of said U-shaped support member and said pulley of said vertical support members and then through said hollow extension means whereby when said hollow extension means is pulled downwardly said linkage unit raises said cradle rig and when said flexible member is then pulled said U-shaped support member is thereby tilted for dumping of a container supported thereon.

References Cited in the file of this patent

UNITED STATES PATENTS

| | | |
|---|---|---|
| 631,717 | Hulett | Aug. 22, 1899 |
| 1,395,040 | Coe | Oct. 25, 1921 |
| 1,510,456 | Cadwalader | Oct. 7, 1924 |
| 2,129,394 | Allen | Sept. 6, 1938 |
| 2,304,649 | McDaniels | Dec. 8, 1942 |
| 2,683,544 | Linde | July 13, 1954 |